United States Patent
Lafont

(10) Patent No.: US 8,613,405 B2
(45) Date of Patent: Dec. 24, 2013

(54) ASSEMBLY FOR AN AIRCRAFT COMPRISING A TURBOMACHINE ATTACHMENT STRUT OF WHICH THE MEANS FOR ATTACHMENT TO THE WING ARE ARRANGED IN A T SHAPE

(75) Inventor: Laurent Lafont, Pechbusque (FR)

(73) Assignee: Airbus Operations S.A.S., Toulouse (FR)

( * ) Notice: Subject to any disclaimer, the term of this patent is extended or adjusted under 35 U.S.C. 154(b) by 185 days.

(21) Appl. No.: 13/384,650

(22) PCT Filed: Jul. 29, 2010

(86) PCT No.: PCT/FR2010/051616
§ 371 (c)(1),
(2), (4) Date: Jan. 18, 2012

(87) PCT Pub. No.: WO2011/012821
PCT Pub. Date: Feb. 3, 2011

(65) Prior Publication Data
US 2012/0111996 A1    May 10, 2012

(30) Foreign Application Priority Data
Jul. 31, 2009   (FR) ..................................... 09 55423

(51) Int. Cl.
*B64D 27/26* (2006.01)
(52) U.S. Cl.
USPC ........................................... 244/54; 248/555
(58) Field of Classification Search
USPC .................. 244/54; 248/555, 554, 556, 557
See application file for complete search history.

(56) References Cited

U.S. PATENT DOCUMENTS

| | | | | |
|---|---|---|---|---|
| 5,873,547 | A * | 2/1999 | Dunstan | 244/54 |
| 7,448,573 | B2 * | 11/2008 | Lafont et al. | 244/54 |
| 7,607,609 | B2 * | 10/2009 | Levert | 244/54 |
| 7,963,480 | B2 * | 6/2011 | Lafont et al. | 244/54 |
| 7,967,242 | B2 * | 6/2011 | Combes et al. | 244/54 |
| 8,141,817 | B2 * | 3/2012 | Baillard et al. | 244/53 R |
| 8,251,309 | B2 * | 8/2012 | Sammito et al. | 244/54 |
| 8,251,311 | B2 * | 8/2012 | Combes et al. | 244/54 |
| 2010/0314491 | A1 | 12/2010 | Forbes et al. | |
| 2011/0114786 | A1 * | 5/2011 | Guillet et al. | 244/54 |
| 2011/0259997 | A1 * | 10/2011 | Marechal | 244/54 |
| 2011/0284686 | A1 * | 11/2011 | Caruel et al. | 244/54 |
| 2011/0290934 | A1 * | 12/2011 | Journade et al. | 244/54 |
| 2012/0080554 | A1 | 4/2012 | Lafont et al. | |

FOREIGN PATENT DOCUMENTS

FR         2 887 522       12/2006
WO      2009 066103        5/2009

OTHER PUBLICATIONS

International Search Report Issued Jan. 31, 2011 in PCT/FR10/51616 Filed Jul. 29, 2010.

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

An assembly for an aircraft including: a mechanism attaching a primary structure of an attachment strut to a wing, forming an isostatic system; an attachment housed in a leading edge of the wing and configured to only take up forces exerted along the transverse and longitudinal directions; and an attachment including a connecting rod extending rearwardly, of which one end is connected to the primary structure and the other end is connected to the wing element, the connecting rod being offset along the vertical direction of the attachment.

9 Claims, 7 Drawing Sheets

ASSEMBLY FOR AN AIRCRAFT COMPRISING A TURBOMACHINE ATTACHMENT STRUT OF WHICH THE MEANS FOR ATTACHMENT TO THE WING ARE ARRANGED IN A T SHAPE

The present invention generally relates to the field of assemblies for aircrafts comprising a wing element, a turbomachine preferably of the dual-flow jet engine type, and an attachment strut for attaching the turbomachine on the wing element, preferably provided to suspend the turbomachine under the wing.

The invention more precisely relates to the design of the attachment strut of such an assembly, and aims to reduce its bulk so as to limit the aerodynamic losses it is likely to cause.

To that end, the invention first relates to an assembly for an aircraft comprising a wing element, a turbomachine and an attachment strut for attaching the turbomachine on the wing element, the attachment strut comprising a primary structure for the passage of forces as well as a means for attaching said primary structure on the wing element, forming an isostatic system.

According to the invention, said attachment means is made up of the following elements:

- a first attachment or a first group of attachments housed in a leading edge of the wing element, and designed to ensure only the reaction of the forces exerted in a transverse direction of the turbomachine and in a longitudinal direction thereof;
- a second attachment housed in the leading edge of the wing element, offset in the transverse direction of the first attachment or the first group of attachments, and designed to ensure the reaction only of the forces exerted in the longitudinal direction of the turbomachine,
- a third attachment or a third group of attachments offset in a vertical direction of the first attachment or the first group of attachments and the second attachment, and designed to react only the forces exerted in the transverse direction of the turbomachine and in the vertical direction thereof; and
- a fourth attachment comprising a connecting rod extending backward, a first end of which is connected on the primary structure and a second end of which is connected on the wing element, said first connecting rod end being offset in the vertical direction of the first attachment or the first group of attachments.

With the design of the isostatic attachment means according to the invention, the reaction of the momentum exerted in the transverse direction is done in a very satisfactory manner using the first attachment or the first group of attachments and the second attachment each reacting the forces exerted in the longitudinal direction, and on the other hand using the fourth attachment incorporating the connecting rod vertically offset relative to the aforementioned attachments, and reacting the forces exerted in the direction of the connecting rod, which has at least one component in the longitudinal direction due to the fact that it extends backward.

The offset of the involved attachments is therefore done in the vertical direction, unlike the embodiments of the prior art in which the reaction of the momentum exerted in the transverse direction was usually ensured by two attachments spaced transversely on the primary structure, each designed to react forces exerted in the vertical direction.

This results in decreasing the transverse bulk of the primary structure of the strut supporting the attachment means, and therefore reducing the aerodynamic losses related to the presence of the strut within the assembly. In this respect, it is noted that in the preferred case of a dual-flow turbomachine, the primary structure of the strut is generally made to cross through at least part of the secondary annular channel. By introducing a smaller transverse dimension within the channel, the primary structure only procures small disruptions of the secondary flow, so that the overall performance of the aircraft remains satisfactory.

Furthermore, the offset in the transverse direction between the first attachment or the first group of attachments and the second attachment can be very significant, given that these two attachments are housed in the leading edge of the wing element, and they therefore have the full wingspan to be able to be spaced apart without that creating additional aerodynamic disruptions. In other words, these two attachments can be spaced apart from one another as much as necessary according to the full wingspan of the leading edge, which makes it possible to obtain a significant lever arm in reacting the momentum exerted in the vertical direction, using these two attachments each reacting forces exerted in the longitudinal direction. The increase of the lever arm ensures a decrease in the forces to be reacted at each attachment, and therefore makes it possible to reduce the size of those attachments, with a gain in terms of cost and overall mass of the assembly.

Preferably, said third attachment or the third group of attachments is arranged below the first attachment or the first group of attachments, and the first end of the connecting rod connected on the primary structure is arranged below the third attachment or the third group of attachments. This makes it possible to move the connecting rod far away from the first attachment or first group of attachments, for better reaction of the momentum exerted in the transverse direction, usually the most significant due to the fact that it results directly from the longitudinal thrust forces created by the turbomachine during operation. Nevertheless, the third attachment could not be situated between the first attachment and the first end of the connecting rod, for example below that first connecting rod end, without going beyond the scope of the invention.

Preferably, said attachment means are arranged in a T shape as seen in the longitudinal direction, the first attachment or the first group of attachments and the second attachment being respectively connected to the ends of the head of the T housed in the leading edge of the wing element, and the third attachment or the third group of attachments and the connecting rod being connected on the base of the T.

This particular arrangement in a T, in which only all or part of the base of the T is dedicated to penetrating the secondary annular channel of a dual-flow turbomachine, only procures small aerodynamic disruptions on the secondary flow.

To even further decrease these disruptions, it is preferably done so that seen from the front in the longitudinal direction, the third attachment or the third group of attachments and the fourth attachment are concealed by the primary structure of the attachment strut. As a result, it is not necessary to install an additional aerodynamic fairing to conceal said attachments.

Preferably, the first attachment or the first group of attachments is made up of a single attachment, and/or the third attachment or the third group of attachments is made up of a single attachment, even if designs with two distinct attachments could be considered, without going beyond the scope of the invention.

Preferably, the first attachment or the first group of attachments and the second attachment are fastened on an upper end of a front beam of the wing element, traveling along a wingspan direction thereof.

Preferably, the turbomachine is a dual-flow turbomachine and comprises a fan case as well as an intermediate case arranged downstream of the fan case and including a hub bearing structural arms, said turbomachine comprises a first structural enclosure extending downstream from said hub of the intermediate case, this enclosure participating in inwardly radially delimiting a passage for a secondary flow of the turbomachine, and said primary structure of the attachment strut comprises a second structural enclosure, mounted on said first structural enclosure and arranged in the downstream continuation thereof so as also to participate in the inner radial delimitation of the passage for the secondary flow, said primary structure of the attachment strut also comprising an offset structure arranged in the passage for the secondary flow, connecting said second structural enclosure to said wing element and supporting at least a part of said attachment means for the attachment strut, and preferably the entirety thereof.

Such a primary attachment strut structure incorporates a structural enclosure situated as close as possible to the engine axis. Its bulk as well as its overall mass are advantageously decreased. Furthermore, with the fastening between the two structural enclosures each extending all the way around the engine axis, the reaction of the momentum exerted in the transverse direction of the turbomachine can be ensured in an extremely satisfactory manner, thereby greatly reducing the bending of the turbomachine in that direction.

Furthermore, in the case where the turbomachine is intended to be mounted under the wing element of the aircraft, another advantage lies in the fact of being able to install the strut on the wing without it reaching the crest line by the latter, and keeping a sufficient ground clearance under the turbomachine, still due to the installation of the second structural enclosure as close as possible to the engine axis.

The invention also relates to an aircraft comprising at least one assembly as described above, with the wing element preferably consisting of a primary wing of the aircraft.

Other alternatives and features of the invention will appear in the non-limiting detailed description below.

This description will be done in light of the appended drawings, in which.

Figure 1:
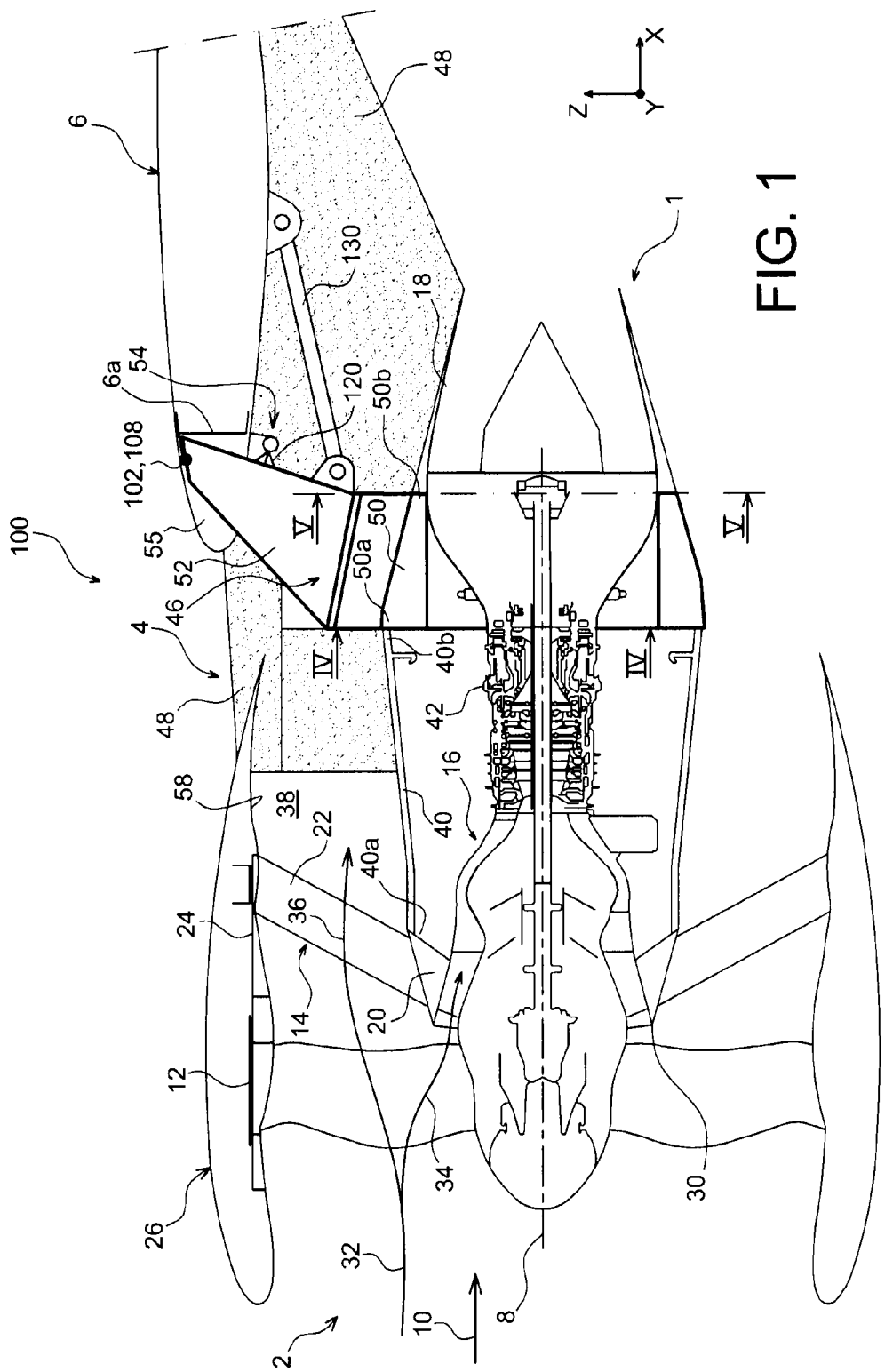
FIG. 1 shows a longitudinal half-sectional view of an assembly for an aircraft according to one preferred embodiment of the present invention, whereof the engine assembly is suspended under an aircraft wing.

FIG. 1 shows an assembly 100 for an aircraft, according to one preferred embodiment of the present invention engine assembly 1. The assembly comprises a wing element 6, here a primary wing of the aircraft, as well as an engine assembly 1 suspended under the wing 6.

The assembly 1 generally comprises a turbomachine, here preferably a dual-flow turbojet engine 2, and an attachment strut 4 making it possible to suspend the turbojet engine under the primary wing 6 of the aircraft.

In the rest of the following description, by convention, X refers to the longitudinal direction of the turbojet engine, which is parallel to a longitudinal axis 8 thereof, and also called engine axis. Additionally, Y refers to the direction oriented transversely relative to the turbojet engine, and Z the vertical direction or the height, these three directions X, Y and Z being orthogonal to one another.

Furthermore, the terms "upstream" and "downstream" should be considered relative to a primarily flow direction of the gases within the turbojet engine, this direction being shown diagrammatically by arrow 10.

In FIG. 1, one can see that the turbojet engine 2 includes a plurality of cases securely connected to one another, i.e. successively from upstream to downstream, a fan case 12, an intermediate case 14, a central case also called gas generator case 16, then a gas discharge case 18. The intermediate case has a hub 20 centered on the axis 8, from which arms 22 extend radially supporting an outer shroud 24 of that case 14. The shroud 24 is situated in the downstream continuation of the fan case 12 to which it is attached, and a nacelle 26 of the turbojet engine surrounds those two elements 12, 24.

The hub 20 is located downstream of a flow separating beak 30, serving to separate the flow 32 entering the fan into a primary flow 34 passing through the gas generator, and a secondary flow 36 intended to use an annular passage 38 provided to that end, also called secondary annular channel.

Aside from the various cases mentioned above, some of which can be made together in a single piece, the turbojet engine comprises a first structural enclosure 40 extending in the downstream direction from the hub 20, substantially in direction X while being centered on the axis 8. Its downstream end 40b is preferably arranged just downstream of the combustion chamber 42 of the turbojet engine, in a transverse plane. Its upstream end 40a, also annular, is attached using bolts on the hub, with a plurality of bolts (not shown) distributed circumferentially. The large number of bolts spaced apart from one another on the upstream end 40a makes it possible to best avoid the harmful effects of ovalization of the enclosure 40, during the operation of the turbojet engine.

The attachment strut 4 has a primary force passage structure 46, also called rigid structure, as well as secondary structures 48 serving essentially to house equipment as well as to form aerodynamic structures forming the junction between the wing 6 and the turbojet engine 2. Here, one can see that the primary structure 46 comprises a second structural enclosure 50, also centered on the axis 8 and secured mounted on the downstream end 40b of the first enclosure 40. Thus, as mentioned above, the junction between the first and second enclosures 40, 50 is located downstream of the first combustion chamber 42, and preferably in a transverse plane situated just at the outlet thereof, as was shown. Furthermore, the primary structure 46 includes an offset structure 52 extending in direction Z from the enclosure 50, and also in direction X toward the back as was diagrammed in FIG. 1. It is in fact possible to see that this structure 52 is equipped at the rear portion with attachment means 54 that will be detailed later, and which make it possible to mount the primary structure on the structural portion of the wing 6, and in particular on its front beam 6a rearwardly delimiting the leading edge 55 of the wing, and traveling along the wingspan thereof.

In this engine assembly 1, the passage 38 for the secondary flow 36 is delimited in the outer radial direction by an inner surface 58 of the nacelle 26. Furthermore, the inner radial delimitation of this passage 38 is first ensured by the hub 20 of the intermediate case 14, then by the outer surface of the structural enclosure 40 containing a portion of the gas generator case 16, and lastly by the outer surface of the structural enclosure 50 situated in the continuation of the first enclosure 40. Thus, the offset structure 52 extends vertically through the passage 38 of the secondary flow, in the same way as the secondary structures 48 of the attachment strut 4.

As shown in FIG. 1, the downstream end 50b of the structural enclosure 50 is located near a junction between the gas generator case 16 and the discharge case 18. Consequently, the second structural enclosure 50 of the attachment strut only extends over a relatively limited axial portion, between the combustion chamber and the gas discharge case 18. For reasons related to mounting the turbomachine on the enclosure 50, the inner surface thereof has a diameter larger than the largest diameter of the turbomachine portion 1 located at the junction between the gas generator case 16 and the discharge case 18.

Figure 2A:
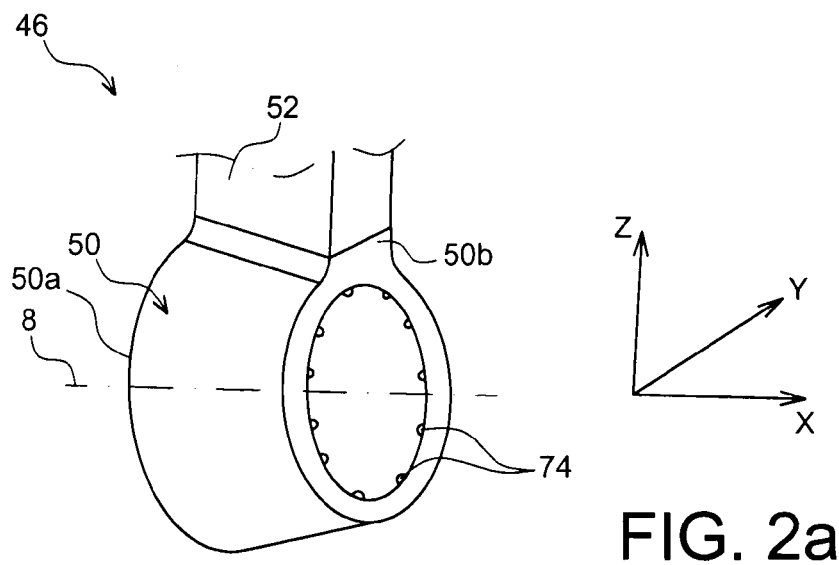
FIGS. 2a and 2b show two perspective views of the primary structure for the passage of forces from the attachment strut belonging to the engine assembly of the assembly shown in FIG. 1, taken along two distinct view angles.
Figure 2B:
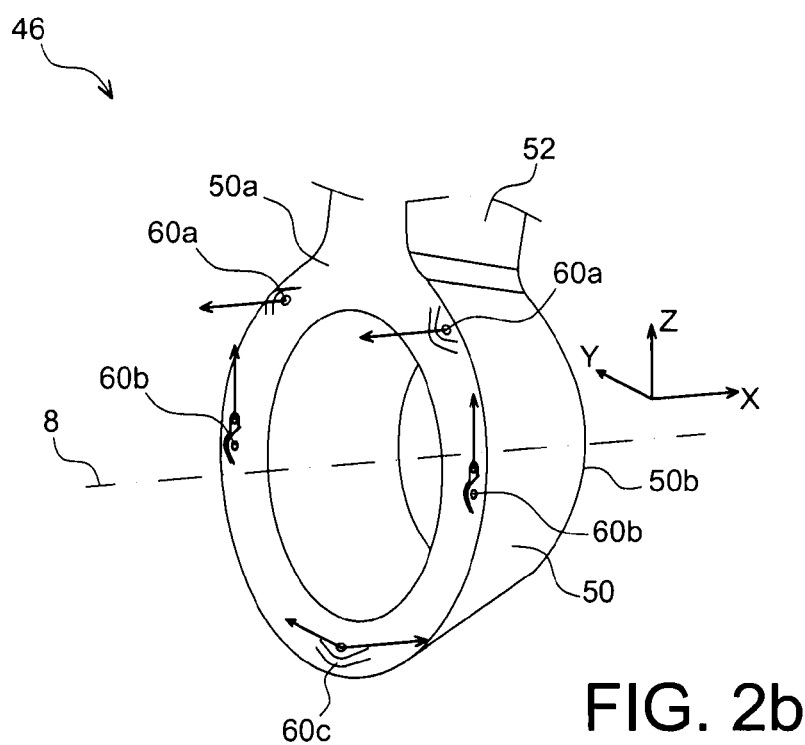

FIGS. 2a and 2b show the primary structure 46 of the attachment strut. This can be made in a single piece, or using elements securely attached on one another. Whatever the case may be, the structural enclosure 50 indeed forms a substantially annular structure and continues all the way around the engine axis 8, through which the downstream end of the gas generator case 16 is intended to penetrate.

On the front end 50a of that enclosure, an attachment means is provided intended to cooperate with complementary attachment means of the downstream end of the first structural enclosure. This attachment means for example comprises two upper attachments 60a arranged on either side of a middle vertical plane (not shown), each intended to react forces exerted in direction X only. They can also comprise two intermediate attachments 60b, arranged on either side of the aforementioned middle vertical plane, and also passed through by a diametric plane of that enclosure. Each of them is here intended to react only the forces exerted in direction Z. Lastly, this means comprises a lower attachment 60c passed through by the middle vertical plane, and intended to react the forces exerted in direction X and in direction Y, but not in direction Z. This makes it possible to obtain mounting means, on the first structural enclosure, that form an isostatic mounting system.

Figure 3A:
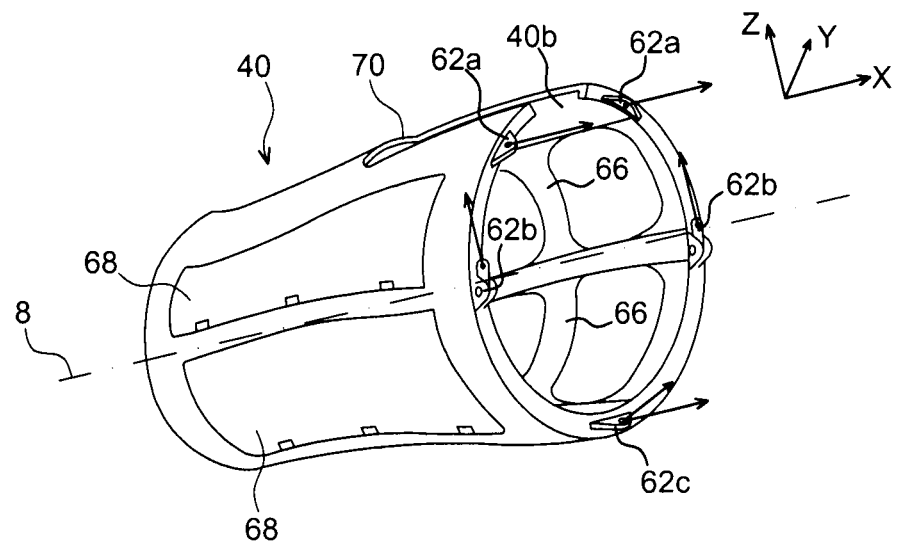
FIGS. 3a and 3b show two perspective views of the first structural enclosure equipping the turbomachine belonging to the engine assembly of the assembly shown in FIG. 1, taken along two distinct view angles.
Figure 3B:
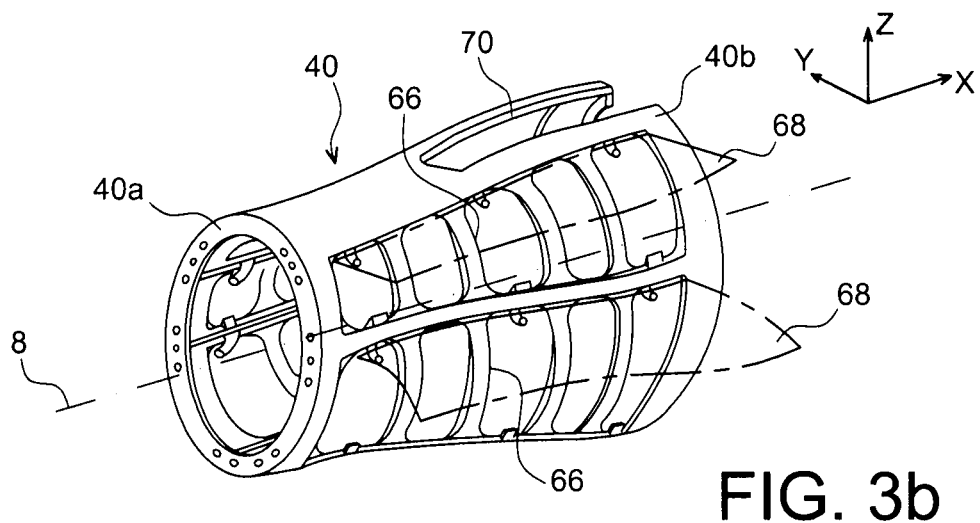

FIGS. 3a and 3b show the first structural enclosure 40, also preferably made in a single piece, or obtained by fixing a plurality of elements to one another. On the downstream end 40b of that enclosure, one can see the complementary attachments 62a, 62b and 62c intended to be mounted on the attachments 60a, 60b, 60c situated opposite them, respectively.

Furthermore, one can see that the structure has holes for access doors 66 intended to allow access to the gas generator case of the turbojet engine, these doors 66 being closed by mobile flaps 68 articulated on this same structure 40. Thus, in the closed position as shown in FIG. 3a, the flaps situated outwardly cover the doors 66 and therefore participate in internally radially delimiting the secondary flow of the turbojet engine. However, when handling operations must be performed on the engine, the flaps can be pivoted in the manner diagrammatically shown in FIG. 3b, so as to free the doors 66, and therefore to allow access to the inner space delimited by said structure 40.

Lastly, as diagrammed in FIGS. 3a and 3b, the enclosure 40 can have an upwardly and rearwardly open slot 70 so as to allow the secondary structures 48 of the attachment strut to pass.

Figure 4:
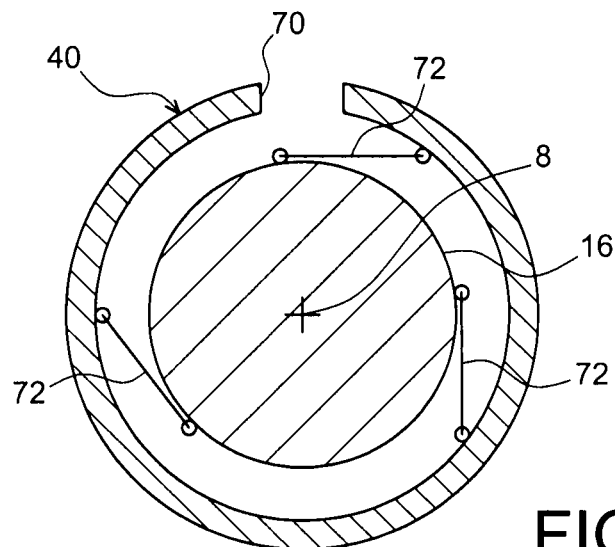
FIGS. 4 and 5 show diagrammatic cross-sectional views taken along lines IV-IV and V-V of FIG. 1, respectively.

Although not shown in FIG. 1, it is provided for the first structural enclosure 40 to be connected to the gas generator case 16 using a plurality of connecting rods 72 regularly circumferentially distributed, for example three, as shown in FIG. 4. Generally, this arrangement where the connecting rods are articulated at each of their ends makes it possible to confront the phenomenon of differential heat expansion between the case 16 and the structure 40. This junction by the connecting rods 72 can alternatively be made on the upstream end 50a of the second structural enclosure 50.

Figure 5:
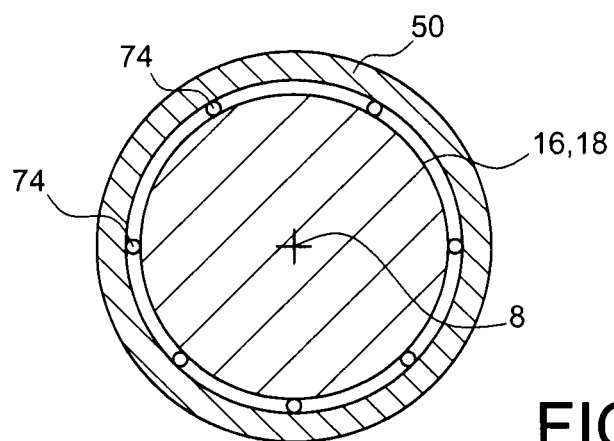

Alternatively or simultaneously, the downstream end 50b of the structural enclosure 50 can be connected to the gas discharge case 18 or to the gas generator case 16, or to the junction between them, via systems 74 regularly circumferentially distributed around the axis 8. These systems 74, shown in FIG. 5, comprise pre-stressed springs making it possible to absorb the relative movements between those two elements 50, 18 between which they are arranged.

Figure 6:
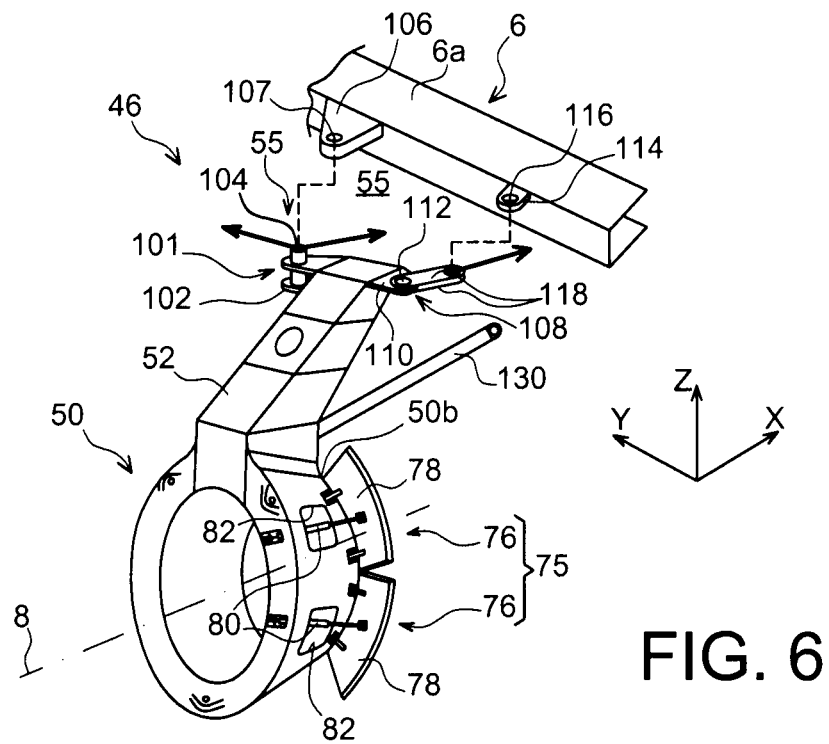
FIGS. 6 and 7 show views similar to those of FIGS. 2b and 2a, respectively, showing the attachment means equipping the attachment strut.

In reference now to FIG. 6, one can first see an alternative embodiment for the primary structure 46 of the attachment strut. This in fact has the particularity of incorporating a thrust reverser system, here based on a so-called articulated mobile flap design. Other designs of thrust reverser systems can nevertheless be considered, without going beyond the scope of the invention.

Thus, the thrust reverser system 75 comprises a plurality of assemblies 76 each incorporating a flap 78 whereof the rear end is articulated on the enclosure 50. During normal operation of the turbojet engine, the flaps 78 are intended to be pressed against the outer surface of the structural enclosure 50, so as to form the inner radial delimitation with them of the passage for the secondary flow. In this position (not shown), the flaps 78, which are articulated at the downstream end 50b of the enclosure 50, having a front end that preferably covers the junction between the two structural enclosures 40, 50.

To ensure the deployment of the flap 78, each assembly 76 comprises actuating means of the cylinder type 80 passing through an opening 82 that is covered by the flap 78 in the folded down position. In this way, when the cylinder 80 deploys after an activation command for the thrust reverser system, the flap 78 pivots around its axis of rotation and gradually deploys in the passage of the secondary flow. Naturally, the deployment of all of the flaps 78, distributed circumferentially around the axis 8, occurs simultaneously.

Once the flaps 78 are deployed, the secondary flow 36 circulating through the passage 38 impacts this radial barrier formed by the set of deployed flaps 78, and is therefore returned countercurrent radially outwardly.

FIG. 6 also shows part of the attachment means 54 serving to attach the primary structure 46 on the wing 6.

This means, which advantageously forms an isostatic system, first comprises a first attachment 101 inserted between an upper end of the front beam 6a of the wing, and an upper end of the offset structure 52. This attachment 101 is provided to be housed within the leading edge 55, like the upper end of the offset structure 52. Consequently, it does not protrude into the secondary annular channel, and therefore does not cause any disruption of the secondary flow. It is designed solely to react forces in directions X and Y, but those exerted in direction Z.

As an example for information, such a reaction of forces can be obtained by providing a yoke 102 secured to the upper end of the offset structure 52, projecting in direction Y while being passed through by an axis 104 oriented in direction Z. Another fitting 106 secured to the front beam 6a is also provided, and has an orifice 107 formed vertically, passed through by the axis 104. The fitting 106 can be arranged between the two heads of the yoke, or outwardly relative thereto, a relative movement in direction Z between the yoke 102 and the fitting 106 remaining possible in both cases.

The means 54 also comprises a second attachment 108 also inserted between the upper end of the front beam 6a of the wing, and the upper end of the offset structure 52. This attachment 108 is also provided to be housed within the leading edge 55. Preferably, it is arranged so that the first and second attachments 101, 108 are situated on either side of a middle vertical plane of the primary structure passing through the axis 8, this plane corresponding to the middle vertical plane of the engine assembly. Furthermore, these two attachments are preferably arranged at a same level in the vertical direction. Consequently, it also does not protrude into the secondary annular channel. It is designed to ensure only the reaction of forces in direction X, but those exerted in directions Y and Z.

As an informational example, such a reaction of forces can be obtained by providing a fitting 110 secured to the upper end of the offset structure 52, projected in direction Y opposite the yoke 102, while being passed through by an axis 112 oriented in direction Z. A fitting 114 secured to the front beam 6a is also provided, and passed through by an axis 116 oriented in direction Z. One or two connecting rods 118 extend in direction X and are articulated at their ends on the axes 112 and 116, so as to create the mechanical connection between the two fittings 110, 114.

Figure 7:
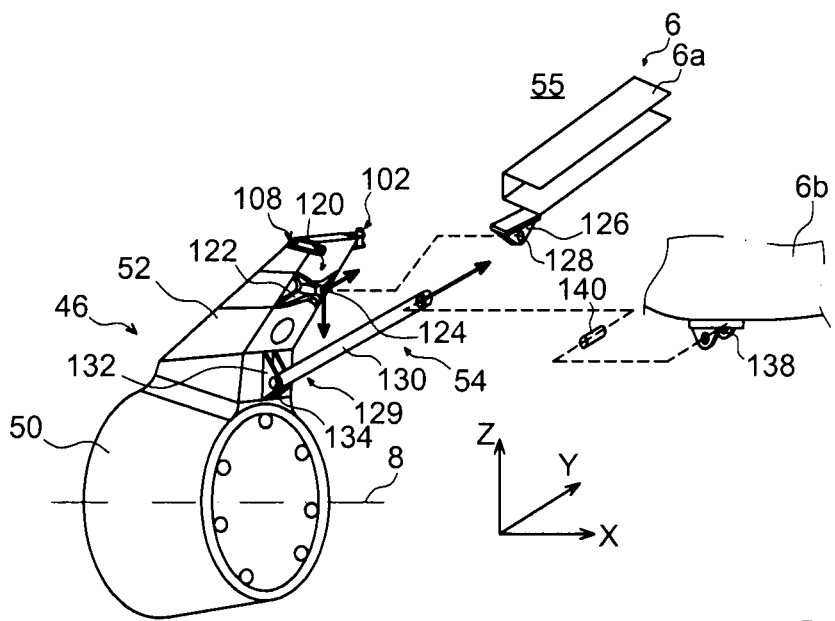

FIG. 7 shows the other elements making up the attachment means 54.

This in particular involves a third attachment 120 inserted between a lower end of the front beam 6a of the wing, and a middle rear portion of the offset structure 52. This attachment 120 is therefore provided under the wing 6, in the secondary annular channel, and designed to ensure only the reaction of forces in directions Z and Y, but not those exerted in direction X.

As an informational example, such a reaction of forces can be obtained by providing a fitting 122 secured to the rear surface of the offset structure 52, projecting in direction X and supporting an axis or pin 124 protruding rearward in direction X. Another fitting 126 secured to a lower end of the front beam 6a is also provided, and has an orifice 128 formed longitudinally, passed through by the axis 124. Here, a relative movement in direction X between the fitting 122 and the fitting 126 remains possible.

The third attachment 120 is therefore situated under the first and second attachments 102, 108, while preferably being passed through by the aforementioned middle vertical plane on either side of which these attachments 102, 108 are arranged.

Lastly, the attachment means 54 comprise a fourth attachment 129 comprising a connecting rod 130 extending backward, arranged in this same middle vertical plane passing through the axis 8, while being inclined in directions X and Z, for example by a value close to 45° relative to those two directions.

A first end of this connecting rod is connected in an articulated manner on the offset structure 52, using a yoke 132 passed through by a transverse articulation axis 134, the yoke being attached on the rear surface of the structure 52, under the third attachment 120, near the junction between the structure 52 and the enclosure 50. Similarly, the opposite end of the connecting rod is connected in an articulated manner on the wing 6, using a yoke 138 passed through by a transverse hinge pin 140, the yoke being fastened under the lower surface of the wing 6, on a structural part 6b situated downstream of the beam 6a.

Using this design, the connecting rod 130 is only capable of reacting a force exerted in its own direction, i.e. a force comprising a component in direction Z and a component in direction X.

With the design described above, the isostatic attachment means can ensure the reaction of forces in direction X using the first and second attachments 102, 108, as well as using the connecting rod 130. Moreover, they ensure the reaction of forces in direction Y using the first and third attachments 102, 120, while they ensure the reaction of forces in direction Z using the third attachment 120 and the connecting rod 130.

Furthermore, the reaction of the momentum exerted in direction X is done using the first and third attachments 102, 120, by reacting the forces in direction Y and due to their offset in direction Z. The reaction of the momentum exerted in direction Y is done using the first attachment 102 and the connecting rod, by reacting forces in direction X and in the direction of the connecting rod, respectively, and due to their offset in direction Z. Lastly, the reaction of the momentum exerted in direction Z is done using the first and second attachments 102, 108, by reacting the forces in direction X, and due to their offset in direction Y, within the wingspan of the leading edge 55.

The attachment means 54 are exclusively formed by the elements described above, i.e. no other element of the assembly 100 participates in attaching the strut on the wing.

Figure 8:
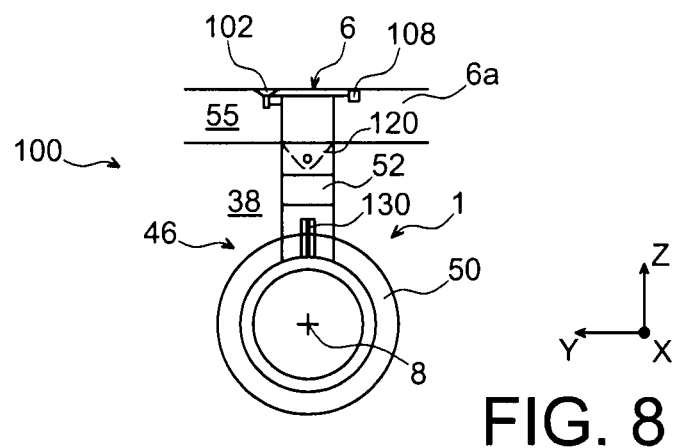
FIG. 8 shows a diagrammatic front view of the primary structure of the attachment strut shown in the preceding figures.

As shown in FIG. 8, the means 54 are arranged in a T seen in direction X, the first attachment 102 and the second attachment 108 respectively being connected to the ends of the head of the T housed in the leading edge 55, and the third attachment 120 as well as the connecting rod 130 being connected on the base of the T, fitting into the aforementioned middle vertical plane and comparable to the offset structure 52. Furthermore, in this view, one can see that the attachments 102, 108, 120 and 129 are concealed by the offset structure 52, so that they do not require an aerodynamic fairing, and therefore procure very few aerodynamic disruptions on the secondary flow passing through the channel 38.

Figure 9:
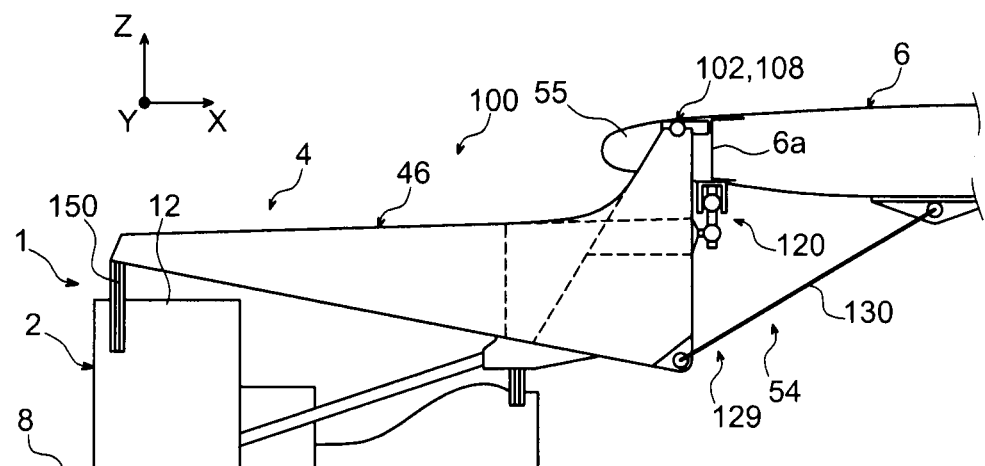
FIG. 9 shows a longitudinal half-sectional view of an assembly for an aircraft according to another preferred embodiment of the present invention, still with its engine assembly suspended under the wing of the aircraft.
Figure 10:
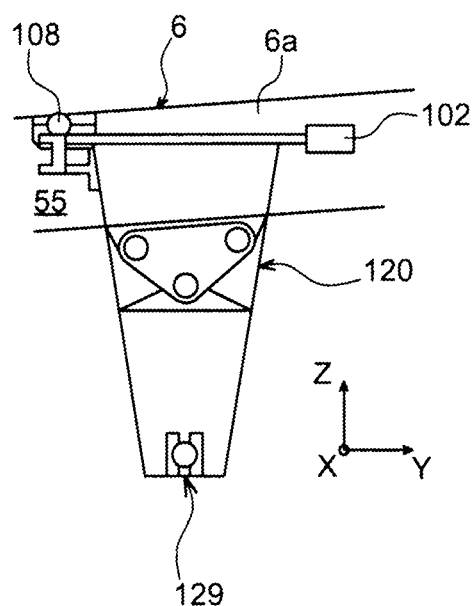
FIG. 10 shows a diagrammatic rear view of the primary structure of the attachment strut belonging to the engine assembly shown in FIG. 9.

FIGS. 9 and 10 show an assembly 100 for an aircraft, according to another preferred embodiment of the present invention. This assembly reacts a significant number of characteristics of the assembly 100 described in reference to the preceding figures. In this respect, in the figures, the elements bearing the same numerical references correspond to identical or similar elements.

In this embodiment, only the design of the primary force reaction structure 46 differs from that shown in the previous figures. In fact, it assumes the form of a substantially longitudinal box, the front end of which is fixed to an upper end of the fan case 12 by an engine attachment 150, and the back end of which is widened in direction Z so as to support the attachment means 54. This means is made up of the same elements 102, 108, 120, 129 described above, and will therefore not be further described.

FIG. 10 shows that the two attachments 102, 108 are in fact housed in the leading edge 55 delimited by the front beam 6a of the wing, and the attachments 120 and 129 are concealed by the box 46, all four attachments here also being positioned in a T-shaped arrangement.

Of course, various modifications can be made by one skilled in the art to the invention just described, solely as non-limiting examples.

The invention claimed is:

1. An assembly for an aircraft comprising:
   a wing element;
   a turbomachine; and
   an attachment strut for attaching the turbomachine on the wing element, the attachment strut comprising a primary structure for passage of forces and attachment means for attaching the primary structure on the wing element, forming an isostatic system;
   the attachment means comprising:
      a first attachment or a first group of attachments housed in a leading edge of the wing element, and configured to ensure only reaction of the forces exerted in a transverse direction of the turbomachine and in a longitudinal direction thereof;
      a second attachment housed in the leading edge of the wing element, offset in the transverse direction of the first attachment or the first group of attachments, and configured to ensure reaction only of the forces exerted in the longitudinal direction of the turbomachine;
      a third attachment or a third group of attachments offset in a vertical direction of the first attachment or the first group of attachments and the second attachment, and configured to react to only the forces exerted in the transverse direction of the turbomachine and in the vertical direction thereof; and
      a fourth attachment comprising a connecting rod extending backward, a first end of which is connected on the primary structure and a second end of which is connected on the wing element, the first connecting rod end being offset in the vertical direction of the first attachment or the first group of attachments.

2. The assembly according to claim 1, wherein the third attachment or the third group of attachments is arranged below the first attachment or the first group of attachments, and the first end of the connecting rod connected on the primary structure is arranged below the third attachment or the third group of attachments.

3. The assembly according to claim 1, wherein the attachment means is arranged in a T shape as seen in the longitudinal direction, the first attachment or the first group of attachments and the second attachment being respectively connected to the ends of the head of the T housed in the leading edge of the wing element, and the third attachment or the third group of attachments and the connecting rod being connected on the base of the T.

4. The assembly according to claim 1, wherein seen from the front in the longitudinal direction, the third attachment or the third group of attachments and the fourth attachment are concealed by the primary structure of the attachment strut.

5. The assembly according to claim 1, wherein the first attachment or the first group of attachments is made up of a single attachment.

6. The assembly according to claim 1, wherein the third attachment or the third group of attachments is made up of a single attachment.

7. The assembly according to claim 1, wherein the first attachment or the first group of attachments and the second attachment are fastened on an upper end of a front beam of the wing element, traveling along a wingspan direction thereof.

8. The assembly according to claim 1, wherein the turbomachine is a dual-flow turbomachine and comprises a fan case and an intermediate case arranged downstream of the fan case and including a hub bearing structural arms,
   wherein the turbomachine comprises a first structural enclosure extending downstream from the hub of the intermediate case, this enclosure participating in inwardly radially delimiting a passage for a secondary flow of the turbomachine, and
   wherein the primary structure of the attachment strut comprises a second structural enclosure, mounted on the first structural enclosure and configured in the downstream continuation thereof so as also to participate in the inner radial delimitation of the passage for the secondary flow, the primary structure of the attachment strut further comprising an offset structure arranged in the passage for the secondary flow, connecting the second structural enclosure to the wing element and supporting at least a part of the attachment means.

9. An aircraft comprising at least one assembly according to claim 1.

* * * * *